United States Patent
Longo

(10) Patent No.: US 6,348,549 B2
(45) Date of Patent: Feb. 19, 2002

(54) PROCESS FOR THE PRODUCTION OF VINYLAROMATIC POLYMERS, OPTIONALLY CONTAINING AN ETHYLENICALLY UNSATURATED NITRILE

(75) Inventor: Aldo Longo, Mantova (IT)

(73) Assignee: Enichem S.p.A., San Donato Milanese (IT)

( * ) Notice: Subject to any disclaimer, the term of this patent is extended or adjusted under 35 U.S.C. 154(b) by 0 days.

(21) Appl. No.: 09/725,567

(22) Filed: Nov. 30, 2000

(30) Foreign Application Priority Data

Dec. 3, 1999 (IT) .......................... MI99A2535

(51) Int. Cl.[7] .............................. C08F 12/02; C08F 2/02
(52) U.S. Cl. ...................... 526/64; 526/65; 526/342; 526/347
(58) Field of Search ............................. 526/64, 67, 68, 526/65, 342, 347

(56) References Cited

U.S. PATENT DOCUMENTS

| | | | |
|---|---|---|---|
| 4,181,788 A | 1/1980 | Wingler et al. | |
| 4,209,599 A | * 6/1980 | Brady et al. | 526/64 |
| 4,952,627 A | 8/1990 | Morita et al. | |
| 5,191,040 A | * 3/1993 | Okumura et al. | 526/65 |
| 5,902,865 A | * 5/1999 | Gausepohl et al. | 526/65 X |
| 6,143,824 A | 11/2000 | Cardi et al. | |

FOREIGN PATENT DOCUMENTS

| | | |
|---|---|---|
| EP | 0 373 883 | 6/1990 |
| EP | 0 400 479 | 12/1990 |
| EP | 0 471 550 A2 | 2/1992 |
| EP | 0 832 904 A1 | 4/1998 |

* cited by examiner

*Primary Examiner*—Fred Teskin
(74) *Attorney, Agent, or Firm*—Oblon, Spivak, McClelland, Maier & Neustadt, P.C.

(57) ABSTRACT

Mass-continuous process for the production of vinylaromatic polymers which comprises feeding a reaction mixture containing at least one vinylaromatic monomer to at least one tubular reactor of the PFR type and operating with a recycling ratio, referring to the recycling flow-rate/feeding flow-rate, of less than 4.

8 Claims, No Drawings

PROCESS FOR THE PRODUCTION OF VINYLAROMATIC POLYMERS, OPTIONALLY CONTAINING AN ETHYLENICALLY UNSATURATED NITRILE

The present invention relates to a process for the production of vinylaromatic polymers, optionally containing an ethylenically unsaturated nitrile.

More specifically, the present invention relates to a process for the production of copolymers based on α-methylstyrene and acrylonitrile (α-SAN) with a mass-continuous process.

In mass-continuous processes for the production of vinylaromatic polymers, such as polystyrene (PS), SAN (styrene-acrylonitrile copolymers), α-SAN, two types of reactors are used: PFR (Plug Flow Reactor) or CFSTR (Continuous Flow Stirred Tank Reactor).

PFR refers to one or more substantially cylindrical reaction containers in series, wherein the mixture of monomers enters the first reaction container with a conversion which is practically zero (<5-10%), it converts along the reactor and, if present, in the subsequent ones, and is then discharged at the desired conversion, generally 60-80%. Processes which use this type of technology are described, for example, in U.S. Pat. Nos. 2,769,804, 2,989,517 and 4,328,186 or in European patent 752,268.

CFSTR are reactors with homogeneous mixing in which the reaction mixture composition is the same in any point of the reactor and the conversion at the outlet is equal to that inside. Processes which use this type of technology are described, for example, in U.S. Pat. Nos. 2,769,804 and 3,954,722 or in German patents 2,809,180 and 3,626,319.

The use of PFR or CFSTR reactors in the polymerization of vinylaromatic polymers has both advantages and drawbacks. For example, the advantages of the PFR reactor can be summarized in process stability, also under gel effect conditions, the possibility of defining an optimum thermal profile, by varying the temperature along the reactor, and the possibility of using up the initiator inside the reactor, thus avoiding degradation problems of the polymer in the subsequent stripping phase of the monomers and residual solvents at a high temperature.

The disadvantages of PFR reactors, on the other hand, essentially consist in the wide molecular weight distribution of the vinylaromatic polymer produced, the high formation of oligomers of the phenyl tetraline type, owing to the unfavorable reaction selectivity and composition heterogeneity for non-"azeotropic" SAN and α-SAN copolymers.

The disadvantages of the PFR reactor can be overcome with the use of CFSTR reactors which allow the production of vinylaromatic polymers with a narrow molecular weight distribution, a low formation of oligomers of the phenyl tetraline type for conversions of the monomers higher than 50% and composition homogeneity for SAN and α-SAN copolymers.

Unfortunately, CFSTR reactors also have various disadvantages which can be overcome with the use of PFR reactors. The two reactors are therefore entirely complementary to each other. Combining a CFSTR reactor and a PFR reactor in a polymerization process of vinylaromatic polymers, has proved to be not very convenient as the sum of the advantages is negatively compensated by the sum of the disadvantages.

In this situation, to find a process for the production of vinylaromatic polymers which allows the advantages of both types of reactor to be exploited without also being subjected to the disadvantages, would prove to be of enormous industrial interest. The Applicant has succeeded in finding this process.

The object of the present invention therefore relates to a mass-continuous process for the production of vinylaromatic polymers, which comprises feeding a reaction mixture containing at least one vinylaromatic monomer to at least one tubular reactor of the PFR type and operating with a recycling ratio, referring to recycling flow-rate/feeding flow-rate, of less than 4.

It has been found, in fact, that the running of a PFR with a low recycling ratio also allows the advantages of CFSTR reactors to be exploited. It is therefore possible with the process of the present invention:

i. to obtain vinylaromatic polymers having good composition homogeneity and a narrow molecular weight distribution;

ii. to obtain complete consumption of the initiator leaving the reactor;

iii. to handle the polymerization with extremely reduced instability and with easily control under gel effect conditions;

iv. to reduce the formation of oligomers of the phenyl tetraline type for conversions of over 50% of the outgoing monomers;

v. to optimize the reaction thermal profile.

According to the process of the present invention, it is possible to obtain the desired results with a single PFR reactor having at least two thermostat-regulation zones or with several PFR in series having a recycling ratio of less than 4 from the last to the first PFR.

Any vinylaromatic monomer can be used in the process object of the present invention. The traditional vinylaromatic monomer is styrene but other styrene monomers can be used, having one or more hydrogen atoms substituted with $C_1$-$C_4$ alkyl or aryl radicals, a halogen or nitro radical such as, for instance, methylstyrene, α-methylstyrene, mono-, di-, tri-, tetra-, penta-chloro styrene and the corresponding α-methylstyrenes, styrenes alkylated in the nucleus and the corresponding α-methylstyrenes such as ortho- and para-methylstyrene, ortho- and para-ethylstyrene, ortho- and para-methyl-α-methylstyrene, etc., either alone or mixed with each other and/or with styrene.

The vinylaromatic monomer can be mixed with an ethylenically unsaturated nitrile such as acrylonitrile or methacrylonitrile, for example in quantities ranging from 5 to 60% by weight with respect to the total weight of monomers, or, as an alternative, to the ethylenically unsaturated nitrile or, in addition to this, mixed with other ethylenically unsaturated monomers in such quantities that the vinylaromatic monomer is present in a concentration of over 40% by weight.

Examples of ethylenically unsaturated monomers are alkyl or cycloalkyl esters of acrylic or methacrylic acid in which the alkyl or cycloalkyl group respectively contain from 1 to 4 carbon atoms and from 4 to 10 carbon atoms such as methylacrylate, methylmethacrylate, ethylacrylate, ethylmethacrylate, butylmethacrylate, cyclohexylmethacrylate, etc. Other ethylenically unsaturated monomers are ethylene, propylene, maleic anhydride, etc.

An inert solvent, which acts as diluent, is added to the mixture to be polymerized, in a quantity of not more than 20% and preferably from 5 to 15% by weight with respect to the mixture to be polymerized. Examples of suitable inert solvents are aromatic hydrocarbons, as etilbenzene ketones, esters and nitriles which are liquid at the polymerization temperature. In addition to ethylbenzene mentioned above, toluene, xylenes or their mixtures can be used as aromatic hydrocarbons. Examples of ketones are 2-butanone, methylethylketone, cyclohexanone, etc. Other examples of solvents which are particularly suitable for the present process are ethyl acetate and acetonitrile.

The polymerization initiators are the conventional ones which are generally used in the polymerization of styrene. As an example, organic peroxides such as dibenzoyl peroxide, ter-butyl peroctoate, ter-butyl perbenzoate, di-ter-butyl peroxide, 1,1'-di-terbutyl peroxycyclohexane, 1,1'-di-terbutyl peroxy-3,3,5-trimethylcyclohexane, or azo-derivatives such as 2,2'-azobis(isobutyronitrile), 2,2'-azomethylbutyronitrile), etc., can be mentioned.

These catalysts are added in a quantity of less than 1% by weight with respect to the monomers, generally from 0.005 to 0.5%.

Finally, the reaction mixture can contain conventional additives which are used in the polymerization of vinylaromatic monomers such as, for example, antioxidants, stabilizers, lubricants, release agents, etc. Among these additives chain transfer agents are particularly important as it is by means of these that the molecular weight of the polymer is regulated. Examples of chain transfer agents are mercaptans containing from 4 to 18 carbon atoms such as, for example, n-butyl mercaptan, n-octyl mercaptan, ter-dodecyl mercaptan, n-dodecyl mercaptan, or terpinolene or the dimer of α-methylstyrene, etc. The transfer agents are added in a quantity ranging from 0.01 to 1.5% by weight calculated with respect to the vinylaromatic monomer.

According to the process object of the present invention, particularly interesting results are obtained by feeding a reaction mixture containing α-methylstyrene and acrylonitrile to at least one tubular reactor of the PFR type and using a recycling ratio equal to about 3.

The PFR reactor has a vertical tubular structure whose length is a multiple of the diameter and inside which the reaction mass is only lightly stirred. The length/diameter ratio is generally higher than 2 and preferably ranges from 3 to 10. Inside the reactor, the reaction temperature is maintained with an increasing profile as far as the outlet of the tubular structure.

In the case of α-SAN, the polymerization reaction is preferably carried out at temperatures lower than 120° C., with residence times of less than 5 hours, to avoid a high formation of oligomers of the phenyl tetraline type which reduce the thermo-resistance properties of the end polymer. In order to respect this temperature limit and residence time, to avoid having residual initiator at the outlet of the tubular reactor, it is advisable to use polymerization initiators with halving times of less than 1 hour at 100° C. and less than 6 minutes at 120° C.

A synthesis in a tubular reactor with a recycling ratio ranging from 2 to 3, within the solid range between inlet and outlet of the tubular reactor of 40-60%, with a temperature profile increasing from 85-100° C. at the inlet and 105-120° C. at the outlet, can be considered optimum.

At the outlet of the tubular reactor, the reaction mixture is then subjected to conventional treatment for the recovery of the polymer produced. This treatment essentially consists in heating the mixture to a temperature of over 190° C. and removing the solvent and non-reacted monomers in an evaporator under vacuum.

An illustrative but non-limiting example is provided hereunder for a better understanding of the present invention and for its embodiment.

EXAMPLE 1

A reaction apparatus is used, consisting of:
a container with two inlets and one outlet, equipped with an anchor stirrer, in which the mixing is carried out at a temperature of 60-70° C. between the mixture of monomers, initiator and solvent and the recycled reaction mixture coming from the tubular reactor;
a gear pump situated at the outlet of the mixer which sends the reaction mixture to the polymerization reactor;
a 120 liter tubular reactor with one inlet and two outlets, equipped with thermostat-regulating tubes with internal oil circulation, arranged in rows perpendicular to the axis of the reactor, and a stirrer with blades free to rotate in the space between the rows of tubes. This reactor is divided into three thermostat-regulation zones at different temperatures;
a gear pump which sends the reaction mixture coming from the outlet of the tubular reactor to the stripping system under vacuum;
a tube which connects an outlet of the tubular reactor with an inlet of the mixer.

Reaction Conditions

Composition of the feeding mixture to the mixer: solvent (cyclohexanone) 10% w/w, acrylonitrile 27% w/w, α-methylstyrene 63% w/w, 2,5-dimethyl-2,5-di(2-ethylhexanoyl-peroxy)hexane 0.35% w/w.

Reaction thermal profile in the tubular reactor: $1^{st}$ zone (inlet) 96° C., $2^{nd}$ zone (intermediate) 103° C., $3^{rd}$ zone (outlet) 107° C.

Overall residence time in the reactor (considering the mixing time zero as the conversion in the mixer is negligible) 4.3 hours.

Recycling ratio (flow-rate of mixture leaving the tubular reactor/flow-rate of mixture of monomers and solvent in the feeding to the mixer) equal to about 3.

Polymer content: inlet of tubular reactor 38.6% solids (due to recycling), outlet of tubular reactor 51% solids;

Analysis of the reaction mixture at the outlet of the tubular reactor:
oligomers 0.444% w/w, residual initiator 0.23% w/w with respect to the feeding, polymer content 51% w/w, acrylonitrile content in the polymer 30.5% w/w, molecular weight of the polymer Mw=98500 dalton.

COMPARATIVE EXAMPLE 1

The same apparatus, composition of the feeding mixture and residence time as example 1, were maintained.

Reaction thermal profile in the tubular reactor: $1^{st}$ zone (inlet) 97° C., $2^{nd}$ zone (intermediate) 107° C., $3^{rd}$ zone (outlet) 107° C.

Recycling ratio (flow-rate of mixture leaving the tubular reactor/flow-rate of mixture of monomers and solvent in the feeding to the mixer) 6.0.

Polymer content: inlet of tubular reactor 42% solids, outlet of tubular reactor 49% solids;

Analysis of the reaction mixture at the outlet of the tubular reactor:
oligomers 0.685% w/w, residual initiator 1.9% w/w with respect to the feeding, polymer content 49% w/w, acrylonitrile content in the polymer 30.5% w/w, molecular weight of the polymer Mw=89100 dalton.

COMPARATIVE EXAMPLE 2

A mixture having the same composition of feeding mixtures, with the same residence time as example 1, with a reaction temperature of 107° C., was fed in continuous, to a 2 liter mixing reactor, equipped with an anchor stirrer having two turbines and an oil-circulation thermostat-regulation jacket.

Analysis of the reaction mixture at the outlet of the mixing reactor (CFSTR):

oligomers 0.604% w/w, residual initiator 2.6% w/w with respect to the feeding, polymer content 47% w/w, acrylonitrile content in the polymer 30.5% w/w, molecular weight of the polymer Mw=83200 dalton.

What is claimed is:

1. A mass-continuous process for the production of vinylaromatic polymers, which comprises feeding a reaction mixture produced in a mixing apparatus and containing at least one vinylaromatic monomer to at least one tubular reactor of the PFR type and operating with a recycling ratio of greater than zero and less than 4, wherein the recycling ratio is defined as the ratio of the flow-rate of mixture leaving the tubular reactor/flow-rate of feed supplied to the mixing apparatus.

2. The process according to claim 1, wherein several PFR reactors are adopted in series, having a recycling ratio of less than 4 from the last to the first PFR.

3. The process according to claim 1, wherein the vinylaromatic monomer is used in a mixture with an ethylenically unsaturated nitrile in quantities ranging from 5 to 60% by weight with respect to the total weight of the monomers.

4. The process according to claim 1, wherein the reaction mixture contains α-methylstyrene and acrylonitrile and the tubular reactor operates with a recycling ratio equal to about 3.

5. The process according to claim 2, wherein the vinylaromatic monomer is used in a mixture with an ethylenically unsaturated nitrile in quantities ranging from 5 to 60% by weight with respect to the total weight of the monomers.

6. The process according to claim 2, wherein the reaction mixture contains α-methylstyrene and acrylonitirile and the tubular reactor operates with a recycling ratio equal to about 3.

7. The process according to claim 3, wherein the reaction mixture contains α-methylstyrene and acrylonitirile and the tubular reactor operates with a recycling ratio equal to about 3.

8. The process according to claim 5, wherein the reaction mixture contains α-methylstyrene and acrylonitrile and the tubular reactor operates with a recycling ratio equal to about 3.

* * * * *